US 6,559,612 B2

(12) United States Patent
Baumgarten

(10) Patent No.: US 6,559,612 B2
(45) Date of Patent: May 6, 2003

(54) SYSTEM AND METHOD FOR THE ELECTRONIC CONTROL OF AN ACTUATOR ASSIGNED TO AN AUTOMATIC CONTROL SYSTEM IN MOTOR VEHICLES

(75) Inventor: Goetz Baumgarten, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 61 days.

(21) Appl. No.: 09/952,507

(22) Filed: Sep. 14, 2001

(65) Prior Publication Data

US 2002/0036477 A1 Mar. 28, 2002

(30) Foreign Application Priority Data

Sep. 14, 2000 (DE) .......................... 100 45 385

(51) Int. Cl.⁷ ................................ H02P 7/00
(52) U.S. Cl. ...................... 318/432; 318/632
(58) Field of Search ................. 318/432, 433, 318/561, 565, 566, 599, 626, 632; 180/443; 701/41

(56) References Cited

U.S. PATENT DOCUMENTS 5,373,911 A * 12/1994 Yasui ...................... 180/443
6,184,637 B1 * 2/2001 Yamawaki et al. ......... 318/432

FOREIGN PATENT DOCUMENTS

| DE | 35 19 220 C2 | 5/1985 |
| DE | 37 19 812 A1 | 6/1987 |
| DE | 40 34 528 A1 | 10/1990 |
| DE | 41 10 148 C2 | 3/1991 |
| DE | 42 23 253 C2 | 7/1992 |
| DE | 43 31 640 C1 | 9/1993 |
| DE | 44 04 668 A1 | 2/1994 |
| DE | 195 07 137 A1 | 3/1995 |
| DE | 196 06 176 A1 | 2/1996 |
| DE | 196 18 484 A1 | 5/1996 |
| DE | 196 21 776 A1 | 5/1996 |
| DE | 196 31 070 A1 | 8/1998 |
| DE | 199 05 433 A1 | 2/1999 |
| DE | 199 43 960 A1 | 9/1999 |

* cited by examiner

Primary Examiner—Khanh Dang
(74) Attorney, Agent, or Firm—Crowell & Moring LLP

(57) ABSTRACT

A system for electronic control of an actuator of an automatic control system in a motor vehicle, has a control unit with at least one control function unit for controlling the actuator as a function of at least one operating parameter at a defined adjusting speed. The control unit has an adjusting rate limiting device assigned to at least one control function unit, for limiting the desired adjusting speed for controlling the actuator defined by the control function unit, to a defined limit value.

5 Claims, 2 Drawing Sheets

SYSTEM AND METHOD FOR THE ELECTRONIC CONTROL OF AN ACTUATOR ASSIGNED TO AN AUTOMATIC CONTROL SYSTEM IN MOTOR VEHICLES

BACKGROUND AND SUMMARY OF THE INVENTION

This application claims the priority of German patent document 100 45 385.6, filed Sep. 14, 2000, the disclosure of which is expressly incorporated by reference herein.

The invention relates to a system for the electronic control of an actuator assigned to an automatic control system in a motor vehicle.

Such a system is known, for example, in conjunction with an automatic control system for the steering angle control of the front wheels of a vehicle from German patent document DE 41 10 148 C2. An electric servo motor on the steering column, for example, is assigned to such a automatic steering angle control system as an actuator. In such systems, the maximally possible adjusting speed is always defined with regard to the control quality, particularly with regard to the stability of the control circuit, for controlling the actuator.

For example, in superposed steering by an automatic steering angle control system, the handling of the motor vehicle is changed by an electronically controlled servo motor on the steering column in order to increase the safety and the driving comfort, and to improve the interaction between the driver and the vehicle. The steering intervention of the automatic control system automatically carried out by the superposed steering in this case is equal to the manual steering intervention by the driver. Such a servo motor can implement steering interventions which correspond to a manual steering angle of 100°.

In view of this background, it is particularly important to limit the effects of a faulty intervention of the automatic control system in all conceivable fault situations. In the most unfavorable case in this context, the servo motor starts to run at a maximal adjusting speed. This may occur, for example, as a result of a faulty jump in measuring signals which represent the operating parameters or input quantities for the automatic control functions. This jump may have the effect of a jump in the actuator adjusting command of the control unit which, in turn, causes the actuator to follow the new adjusting command as fast as possible, thus at a maximal adjusting speed.

In such a case, a fault detection unit must detect the failure within a time period (fault latency period) which is sufficiently brief that a malfunction is occurring and must immediately switch off the system. The switch-off may result in various measures for the actuator or servo motor (compare FIG. 1a):

Measure A: The servo motor can no longer be moved into a switch-off position in a controlled manner. It can still be stopped only in the momentary position. In the case of a motor vehicle, the driver must be able to correct this "offset steering angle" as fast as possible.

Measure B: The servo motor which has "run away" at the maximal adjusting speed is moved to zero (or another defined adjusting position) after the detection of a malfunction and is held there. The fault latency period (tf1) represents the essential quantity here: the longer the fault latency period, the farther the adjusting angle can move away from its desired position and the larger the direction and course deviation of the vehicle from the desired path in the example of the automatic steering angle control system. If, for example, the fault latency period amounts to 200 ms, at a maximal adjusting speed of 300°/s, a steering angle of 60° can be reached.

In FIG. 1a, time t is shown on the abscissa and the steering angle w3 of the actuator (in the event of a faulty intervention) is illustrated on the ordinate. The area under the steering angle course in FIG. 1a is proportional to the course angle deviation which occurs as a result of the faulty adjusting intervention in the example of the automatic steering angle control system. A linear vehicle model is assumed in this case. This result reduces as much as possible the area below the steering angle course according to the faulty adjusting intervention over the time. FIG. 1b shows how, in the case of both switch-off measures A and B, a shortening of the fault latency period (here tf2<tf1) reduces the area. The adjusting courses from FIG. 1a are indicated in FIG. 1b by a broken line. The switch-off measure B results in a finite area which is reduced by shortening the fault latency period. In the case of switch-off measure A, the area or the course angle deviation continues to increase over the time t but at a reduced speed.

The fault latency period results from the computing time which is required by a fault detecting unit in the control unit for checking or detecting the fault. Thus, the fault latency period cannot be arbitrarily shortened. Furthermore, the fault latency period depends on the type of the faulty function. For faults in the control unit or in the actuator control, a relatively short fault latency period can, for example, be achieved. For faults in the measuring signals, for example, for the determination of the yaw rate or of the lateral acceleration, which in the case of automatic steering angle control systems are normal operating parameters or measuring quantities on which the actuator control depends, the identification of a fault may be significantly more difficult, and the fault latency period may therefore be much longer.

One possible remedy is to double the number of sensors, which are difficult to monitor, determining the plausibility of the signals by a mutual comparison. The disadvantage here are the costs of the additional sensors.

It is therefore an object of the invention to increase the reliability of an automatic control system without additional costs when faults occur.

This and other objects and advantages are achieved by the control system according to the invention, which is based on the idea of limiting the time-related derivation of the actuator adjusting command that is dependent particularly on the sensor signals which are difficult to monitor. According to the invention the actuator is operated only at a reduced adjusting speed (for example, at 70% of the maximally possible adjusting speed) already in the no-fault operation. After detection of a fault (thus after the expiration of the fault latency period tf1; compare FIG. 1c), the actuator is preferably moved back to the defined adjusting position at a maximum possible adjusting speed (measure A) or is held at the current position (measure B). As illustrated in FIG. 1c, without any shortening of the fault latency period (tf1), a clearly reduced area is therefore obtained under the adjusting course. For a comparison with an actuator control without the invention, FIG. 1c shows, in the example of the automatic steering angle control system, the adjusting courses or the courses of the steering angle w3 of the actuator of FIG. 1a by means of a broken line.

The reduction of the maximal adjusting speed in normal operation is achieved by means of an adjusting rate limiting device between the automatic control and the actuator.

An automatic control system can, for example, carry out several partial functions, one automatic control function unit being assigned to each partial function in the control unit. In this case, a first group of partial functions or of control function units may not depend on measuring signals with a long fault latency period, so that these control function units can operate the actuator at a maximally possible adjusting speed. A second group of partial function or of control function units depends on the signals which can only be monitored with a long fault latency period. In the case of these control function units or partial functions, the adjusting command is provided with an adjusting rate limitation so that the effects of a faulty input signal will not result in an excessively fast running away of the actuator or in an excessively large area under the adjusting course. The reduction of the maximal adjusting speed in the second group of partial functions or of the control function units by means of the adjusting rate limitation is limited such that the connected power losses of this partial function do not interfere.

If the implementation of the adjusting rate limitation should result in stability problems because of closed control circuits, countermeasures can be taken which are suggested, for example, in German Patent Document DE 10021856 which has not yet been published.

The main advantage of the invention is that, in a fault detection unit with a defined minimal fault latency period and a defined upper limit for the effects of a fault event, first, no changes in the fault detection unit are required while maintaining the feasible fault latency period; second, only a minor change is required in the concerned partial functions by inserting an adjusting rate limitation or an "intelligent" adjusting rate limiting device; and third, doubling of the sensors or a high-expenditure further development of the algorithm for the fault detection unit or other high-cost alternative measures can be avoided.

Other objects, advantages and novel features of the present invention will become apparent from the following detailed description of the invention when considered in conjunction with the accompanying drawings.

DETAILED DESCRIPTION OF THE DRAWINGS

Figure 1A:
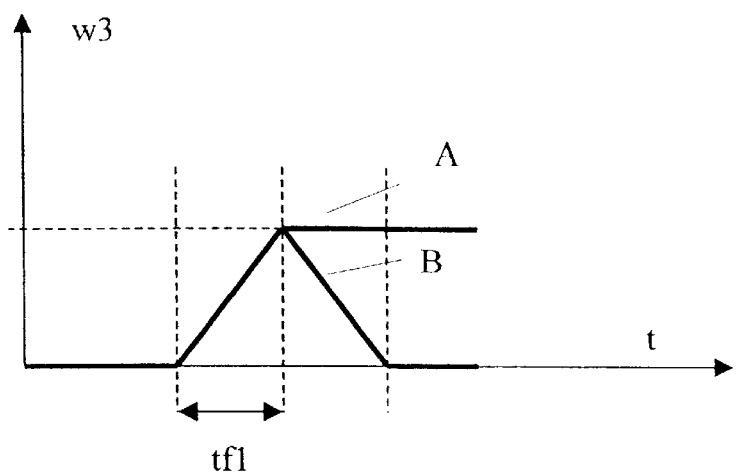
FIG. 1a is a view of the adjusting course with a long fault latency period without the invention.
Figure 1B:
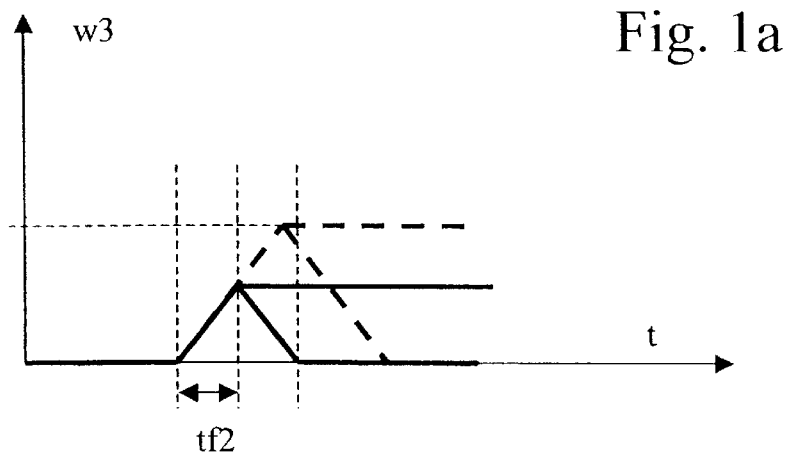
FIG. 1b is a view of an adjusting course with a short fault latency period without the invention.
Figure 1C:
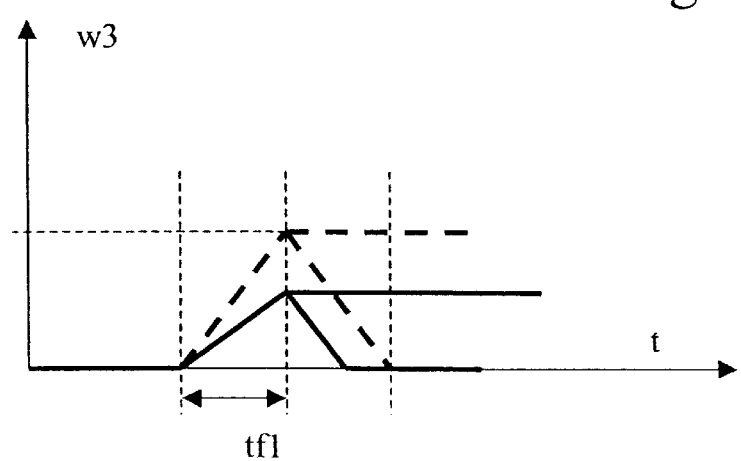
FIG. 1c is a view of an adjusting course with a long fault latency period with the invention.

The effects of the invention have been described previously, in conjunction with FIGS. 1a to 1c.

Figure 2:
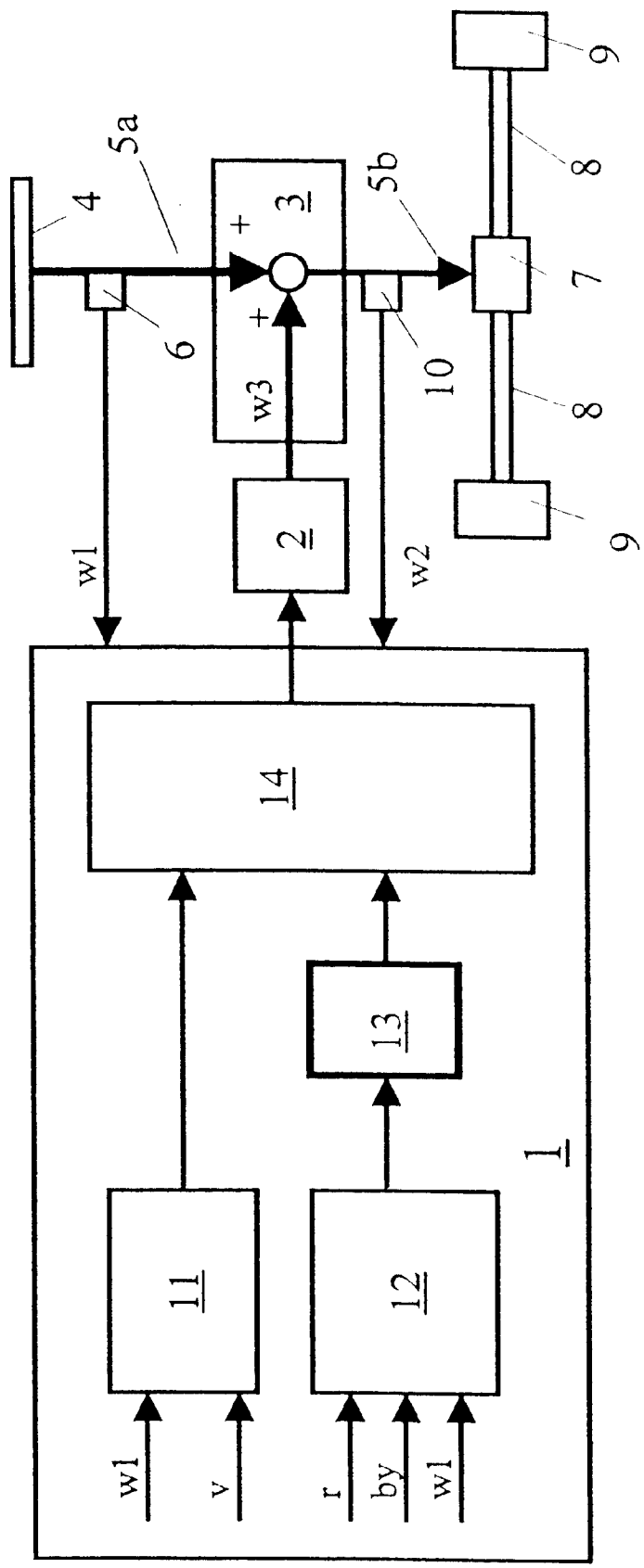
FIG. 2 is a view of the system according to the invention in a control unit.

FIG. 2 shows a steering arrangement which comprises a steering wheel 4 connected with a first portion of a steering column 5a. The first portion of the steering column 5a is connected by way of a transmission 3 with a second portion of the steering column 5b. The second portion of the steering column 5b ends in a servo transmission 7 which establishes a connection to a steering linkage 8, which in turn adjusts wheels 9 in a known manner. On the first portion of the steering column 5a, a sensor 6 is arranged which senses the steering angle w1 carried out manually by the driver by means of the steering wheel 4 and transmits it to a control unit 1. The control unit 1 also receives a summation steering angle w2 which is detected by means of a sensor 10 arranged on the second portion of the steering column 5b. The summation steering angle w2 is the result of the addition of the manually implemented steering angle w1 and of an automatically implemented steering angle w3. The steering angle w3 is adjusted by means of the transmission 3 by way of an actuator 2. The actuator 2 is controlled by way of an output signal of the control unit 1 which defines particularly also the adjusting speed of the actuator 2.

In the illustrated example 2, the control unit 1 comprises control function units 11 and 12. The control function unit 11 receives the manual steering angle w1 and the vehicle velocity v as input signals. It is responsible for a partial function of the automatic steering angle control system which, depending on the manual steering angle w1 and the vehicle velocity v, provides the driver with a partial angle of the automatic steering angle w3 for a power steering. This partial function does not depend on measuring signals with a long fault latency period. This means that the computing time for detecting the fault in the control function unit 11 also in view of the fault checking of the input signals w1 and v is shorter than a defined computing time threshold. The controlling of the actuator depending on this control function unit 11 can therefore be carried out at a maximally possible adjusting speed. The output signal of the control function unit 11 is therefore fed without time limitation to an addition point 14 which transmits this output signal directly to the actuator 2.

Furthermore, the control unit 1 includes a control function unit 12, which receives the yaw rate r, the lateral acceleration by and the manual steering angle w1 as input signals, and carries out, for example, a steering angle intervention for stabilizing the vehicle during cornering. The fault checking, and thus the fault detection with a view to the measuring signals which are used for forming the yaw rate r and the lateral acceleration by, requires a computing time which is longer then a defined computing time threshold. The control function unit 12 is therefore assigned to a partial function with a long fault latency period. The long fault latency period is particularly the result of the required plausibility monitoring of the measuring signals of a yaw rate sensor and of a lateral acceleration sensor by means of the summation steering angle w2. The output signal of the control function unit 12 therefore leads to an adjusting rate limiting device 13 by means of which the normally maximum possible desired adjusting speed for controlling the actuator 2 defined by the control function unit 12 can be reduced to a defined limit value.

According to the invention, the defined limit value may be a fixed value or a variable value which is a function of certain operating parameters. The reduction of the adjusting speed by the adjusting rate limiting device can also be switched off as a function of certain operating conditions in that, for example, the defined limit value can temporarily be set to infinite. The output signal of the control function unit 12 is therefore transmitted as a desired value reduced in view of the adjusting speed to the addition point 14 and finally to the actuator 2.

Several partial functions with a long fault latency period and/or several partial functions with a short fault latency period can be provided in the control unit 1. Although, with respect to reliability, an adjusting rate limitation can be carried out in the case of all partial functions or control function units, this would in some cases unnecessarily impair the high control speed which is desirable in a no-fault case. According to the invention, basically all output quantities of the control function units which, in particular, carry out partial functions with a long fault latency period, experience an adjusting rate limitation. As a result of the invention, therefore, an increase of the reliability is achieved not only in the case of automatic steering angle control systems but also in the case of all comparable automatic control systems with electronically controlled actuators.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for electronic control of an actuator of an automatic control system in a motor vehicle, comprising:
    a control unit which has at least one control function unit for controlling the actuator as a function of at least one operating parameter at a defined adjusting speed;
    wherein the control unit has an adjusting rate limiting device assigned to at least one control function unit, by means of which adjusting rate limiting device a desired adjusting speed for controlling the actuator defined by the control function unit can be reduced to a defined limit value.

2. The system according to claim 1, wherein the adjusting rate limiting device is arranged between the control function unit and the actuator.

3. The system according to claim 1, wherein
    the control unit has at least two control function units; and
    an adjusting rate limiting device is assigned to only one control function unit which requires more than a defined computing time for fault detection.

4. The system according to claim 2, wherein
    the control unit has at least two control function units; and
    an adjusting rate limiting device is assigned to only one control function unit which requires more than a defined computing time for fault detection.

5. A method for electronic control of an actuator of an automatic control system in a motor vehicle, said method comprising:
    controlling the actuator as a function of at least one operating parameter at a defined adjusting speed, by means of a control function unit in a control unit;
    reducing a desired adjusting speed for controlling the actuator, defined by the control function unit, to a defined limit value, via an adjusting rate limiting device assigned to the control function unit.

* * * * *